United States Patent
Kim et al.

(10) Patent No.: US 8,862,343 B2
(45) Date of Patent: Oct. 14, 2014

(54) TURNING CONTROL APPARATUS FOR A HYBRID CONSTRUCTION MACHINE

(75) Inventors: Kyeong Keun Kim, Gyeonggi-do (KR); Sang Il Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/997,548

(22) PCT Filed: Dec. 26, 2011

(86) PCT No.: PCT/KR2011/010121
§ 371 (c)(1),
(2), (4) Date: Jun. 24, 2013

(87) PCT Pub. No.: WO2012/087083
PCT Pub. Date: Jun. 28, 2012

(65) Prior Publication Data
US 2013/0304332 A1 Nov. 14, 2013

(30) Foreign Application Priority Data
Dec. 24, 2010 (KR) .................. 10-2010-0134390

(51) Int. Cl.
*G06F 7/70* (2006.01)
(52) U.S. Cl.
USPC .......................................... 701/50
(58) Field of Classification Search
None
See application file for complete search history.

(56) References Cited

U.S. PATENT DOCUMENTS

| 2001/0011050 A1* | 8/2001 | Yamaguchi et al. | 477/3 |
| 2010/0318250 A1* | 12/2010 | Mitsutani | 701/22 |
| 2013/0058750 A1* | 3/2013 | Hiroki et al. | 414/744.2 |

FOREIGN PATENT DOCUMENTS

| JP | 08-019116 A | 1/1996 |
| JP | 11-008945 A | 1/1999 |
| JP | 2001-003396 A | 1/2001 |
| WO | 0058568 A | 10/2000 |

OTHER PUBLICATIONS

Search Report dated Jul. 30, 2012 and written in Korean with English translation attached for International Patent Application No. PCT/KR2011/010121 filed Dec. 26, 2011, 5 pages.

* cited by examiner

*Primary Examiner* — Thomas Tarcza
*Assistant Examiner* — Adam Alharbi
(74) *Attorney, Agent, or Firm* — John D. Veldhuis-Kroeze; Westman, Champlin & Koehler, P.A.

(57) ABSTRACT

A turning control apparatus for a hybrid construction machine may include an engine, an oil hydraulic pump, an electric energy storage device, an engine assistant motor, a turning motor, a power converter, a battery, an HCU, an SMPS configured to apply electric power to the HCU by being supplied with electric power from the battery, a Key1 configured to switch a VKey_On path which supplies electric power from the battery to the SMPS when a key on signal of a driver is inputted, and a Key2 configured to switch a VKey_Out path which allows electric power to be supplied from the battery to the SMPS when an operation of the Key1 is stopped, in which the Key2 is switched when it is confirmed that the turning motor is being driven in a state in which an operation of the Key1 is stopped.

14 Claims, 4 Drawing Sheets

TURNING CONTROL APPARATUS FOR A HYBRID CONSTRUCTION MACHINE

CROSS-REFERENCE TO RELATED APPLICATION

This Application is a Section 371 National Stage Application of International Application No. PCT/KR2011/010121, filed Dec. 26, 2011 and published, not in English, as WO2012/087083 on Jun. 28, 2012.

FIELD OF THE DISCLOSURE

The present disclosure relates to a hybrid construction machine, and particularly, to a turning control apparatus for a hybrid construction machine, capable of enabling a zero speed control of a turning motor when the engine is stalled or a driver performs a key off manipulation during a turning drive of an upper turning body.

BACKGROUND OF THE DISCLOSURE

Recently, as oil prices rapidly increase, researches are being actively conducted on a hybrid construction machine which improves fuel efficiency by storing surplus power of an engine in electric energy storage devices such as batteries, ultra capacitors, or the like and supplying power from the electric energy storage apparatus to the engine having insufficient power. The hybrid construction machine such as an excavator includes an oil hydraulic pump which hydraulically drives work elements such as a boom, an arm, a bucket, and the like, and an engine assistant motor is connected to the engine for driving the oil hydraulic pump. The engine assistant motor assists a drive of the engine, and charges electric energy by power generation in the electric energy storage device. In addition, a turning control apparatus is being developed which turns an upper turning body using a turning motor which is driven by electric energy of the electric energy storage device.

In the hybrid construction machine in the related art, the oil hydraulic pump is driven by the engine and the engine assistant motor, surplus power of the engine and regenerative energy of the engine assistant motor are converted into electric energy and stored in the electric energy storage device, and the engine assistant motor stores electric energy in the electric energy storage device or is driven by electric energy stored in the electric energy storage device. The turning motor, which drives the upper turning body, is driven by electric energy, and electric energy between the electric energy storage device and the engine assistant motor, or between the electric energy storage device and the turning motor is converted by an power converter and used. Here, the constituent components are connected to the power converter, and operations thereof are controlled by a hybrid control unit (HCU).

However, in the aforementioned hybrid construction machine in the related art, electric power is supplied from a typical battery, which is provided in a vehicle separately from the electric energy storage device, to the hybrid control unit in order to supply electricity for starting the engine of the vehicle or supply electricity to various electronic devices. That is, electric energy is supplied from the battery to a switching mode power supply (hereinafter referred to as SMPS) by a switch Key1 which is operated by a key on signal by an operator, and the SMPS controls the supplied electric power and supplies electric power to the hybrid control unit.

Meanwhile, when a turning drive of the upper turning body is performed using the turning motor, a drive direction and a drive speed of the turning motor are controlled in accordance with a signal transmitted from the hybrid control unit. For this reason, when electric power of the battery, which supplies electric power to the hybrid control unit that controls the turning motor, is blocked, that is, when the switch Key1 is off by a stop of the engine or a key off manipulation of a driver, a control operation of the hybrid control unit is stopped, it is impossible for the turning motor to be controlled such that the upper turning body continues the turning operation for a predetermined time.

When it is impossible to control the turning operation of the upper turning body as the stop of the engine or the key off manipulation of the driver is performed during the turning operation as described above, rotational inertia of the upper turning body is high, and therefore there is a problem in that when the upper turning body collides with surrounding obstacles or the like within a turning radius, or a front collides with the ground on a hill or the like, the vehicle, equipment, and the like are damaged, or injury to a human is caused.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

An embodiment of the present disclosure has been made in an effort to solve the aforementioned problem, and an object of the present disclosure is to provide a turning control apparatus for a hybrid construction machine, capable of safely enabling a zero speed control of a turning motor when an electric power supply from a battery to a hybrid control unit is blocked during a turning drive of an upper turning body.

To this end, a turning control apparatus for a hybrid construction machine according to the present disclosure may include an engine 10, an oil hydraulic pump 20, an electric energy storage device 30, an engine assistant motor 40, a turning motor 50, a power converter 60, a battery 300 mounted in a vehicle separately from the electric energy storage device, and a hybrid control unit (HCU), an SMPS configured to apply operating electric power to the hybrid control unit (HCU) by being supplied with operating electric power from the battery 300, a first switch Key1 configured to switch a VKey_On path which supplies operating electric power from the battery to the SMPS when a key on signal of a driver is inputted, and a second switch Key2 configured to switch a VKey_Out path which allows operating electric power to be supplied from the battery to the SMPS when an operation of the first switch Key1 is stopped, in which the second switch Key2 is switched when it is confirmed that the turning motor 50 is being driven in a state in which an operation of the first switch Key1 is stopped.

A turning control apparatus for a hybrid construction machine according to another exemplary embodiment of the present disclosure includes an engine 10, an oil hydraulic pump 20, an electric energy storage device 30, an engine assistant motor 40, a turning motor 50, a power converter 60, a battery 300 mounted in a vehicle separately from the electric energy storage device, a hybrid control unit (HCU), an SMPS configured to apply operating electric power to the hybrid control unit (HCU) by being supplied with operating electric power from the battery 300, a second switch Key2 configured to switch a Vkey_out that is a path which supplies operating electric power from the battery to the SMPS, and a first switch Key1 installed in a Vkey_on path connected to the battery and configured to switch the second switch Key2 to be in an ON state by being switched when a key on signal of a driver is inputted, in which when a drive of the turning motor is performed, the hybrid control unit (HCU) controls an ON state of the second switch Key2 to be continued even though the first switch Key1 is turned off.

Here, when the first switch Key1 is turned off in a state in which the second switch Key2 is switched by a drive of the turning motor 50, the hybrid control unit (HCU) may perform a brake control of the turning motor 50 to stop the turning motor 50, and then may turn off the second switch Key2 to block operating electric power which is supplied from the battery.

Moreover, when the first switch Key1 is turned off, and the second switch Key2 is maintained to be in an ON state by the turning operation, the hybrid control unit (HCU) may disregard a turning manipulation inputted by the operator.

Meanwhile, when a possibility that the engine 10 is stalled is high while monitoring a state of the engine 10, the hybrid control unit (HCU) may forcibly stop a drive of the first switch Key1 and switches the second switch Key2, and when the engine 10 is stalled or a key off signal of a user is generated, a drive of the first switch Key1 may be stopped.

As described above, according to an embodiment of the present disclosure, the VKey_Out path, which allows operating electric power to be supplied from the battery to the SMPS when the VKey_On path is blocked in accordance with a stall of the engine, is further included in the hybrid control unit, in addition to the VKey_On path that allows operating electric power to be supplied from the battery to the SMPS in accordance with the key on signal of the operator, such that operating electric power may be separately supplied to the hybrid control unit even though the engine is stalled, and the hybrid control unit may a zero speed control of the turning motor.

DETAILED DESCRIPTION

Hereinafter, an exemplary embodiment of the present disclosure will be described in detail with reference to the accompanying drawings. Configurations and operational effects according to the configurations of the present disclosure will be clearly understood from the description below. It should be noted that prior to detailed descriptions of the present disclosure, specific descriptions regarding publicly known constituent elements, which may obscure the gist of the present disclosure, will be omitted.

Figure 1:
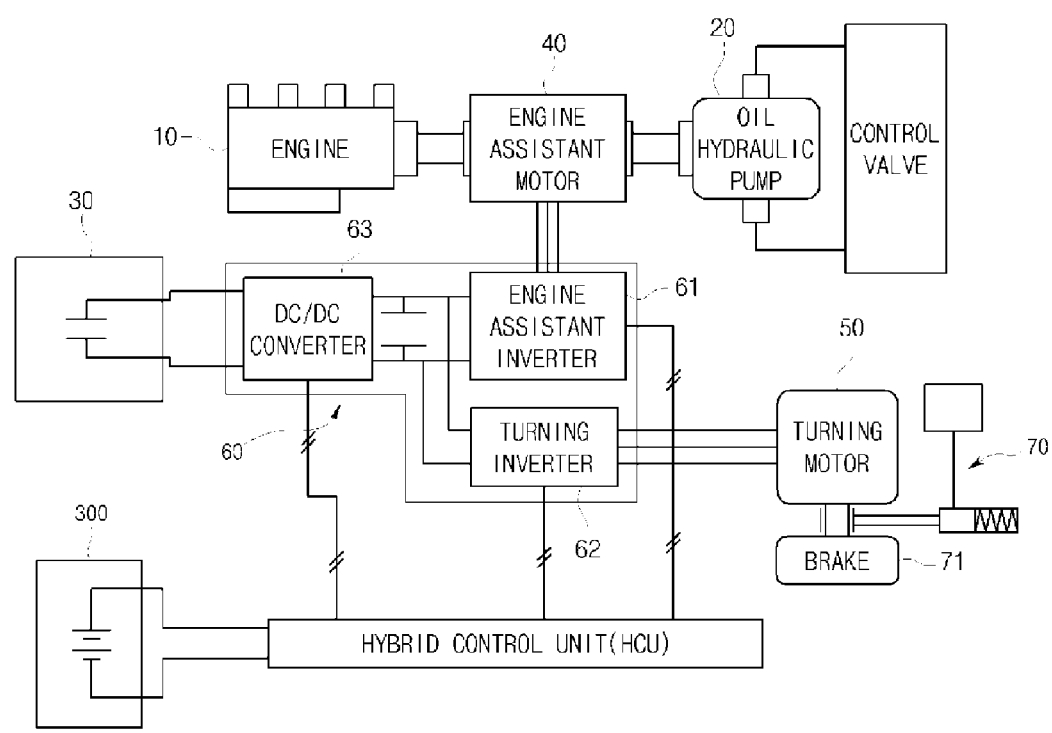
FIG. 1 is a configuration view illustrating a configuration of a hybrid construction machine according to an exemplary embodiment of the present disclosure.
Figure 2:
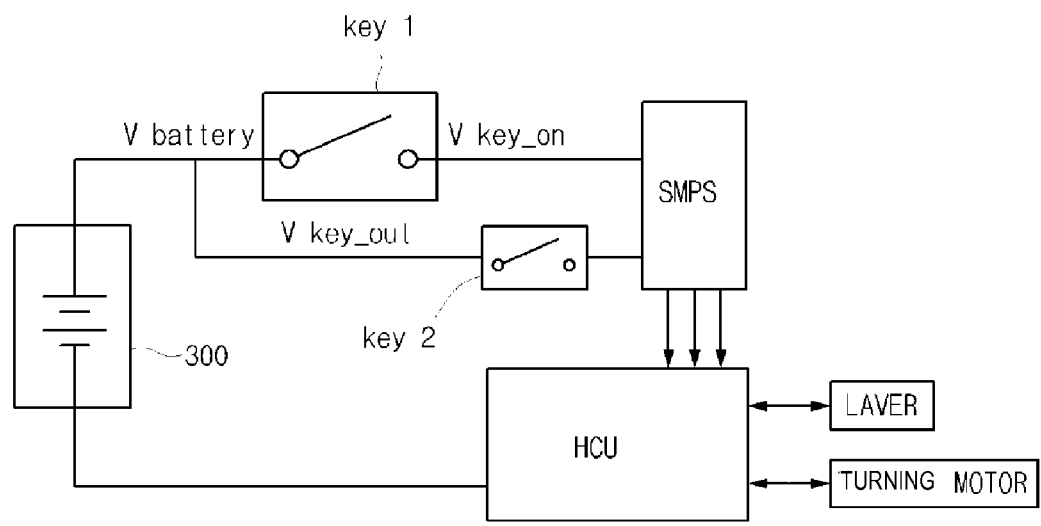
FIG. 2 is a view illustrating a drive circuit diagram of a hybrid control unit in the hybrid construction machine of FIG. 1.

FIG. 1 is a configuration view illustrating a configuration of a hybrid construction machine according to an exemplary embodiment of the present disclosure, and FIG. 2 is a view illustrating a drive circuit diagram of a hybrid control unit in the hybrid construction machine of FIG. 1.

As illustrated in FIGS. 1 and 2, a power control apparatus for a hybrid construction machine according to an exemplary embodiment of the present disclosure includes a variable displacement oil hydraulic pump 20 driven by an engine 10, an electric energy storage device 30 configured to store electric energy made by converting surplus power of the engine 10 with an engine assistant motor 40, the engine assistant motor 40 configured to store electric energy in the electric energy storage device 30 or drive the oil hydraulic pump 20 by being driven by electric energy stored in the electric energy storage device 30, a turning motor 50 configured to store electric energy in the electric energy storage device 30 or turn a turning apparatus 71 by being driven by electric energy stored in the electric energy storage device 30, a power converter 60 including an engine assistant inverter 61, a turning inverter 62, and a DC/DC converter 63, which convert electric energy between the electric energy storage device 30 and the engine assistant motor 40 or between the electric energy storage device 30 and the turning motor 50, and a hybrid control unit (HCU) configured to control an electricity charge and discharge operation of the electric energy storage device 30 and a drive of the turning motor 50 by controlling the power converter 60 by being supplied with operating electric power from a battery of the electric energy storage device 30.

The engine 10 may provide a drive force for driving work devices of the construction machine together with the engine assistant motor 40, and one side of the engine 10 is connected to the oil hydraulic pump 20 through the engine assistant motor 40 so as to be able to transmit power.

The oil hydraulic pump 20 may change a flow rate per unit stroke of operating oil which is discharged in accordance with an angle of a swash plate, and discharges operating oil while changing a flow rate thereof as described above so as to supply operating oil to a control valve. That is, in the oil hydraulic pump 20, a discharge flow rate is changed in accordance with the angle of the swash plate, and the angle of the swash plate is controlled by a pump regulator.

The electric energy storage device 30 refers to a device that stores surplus power of the engine 10 as a form of electric energy, and may be configured by a general battery or a plurality of ultra-capacities. In addition, the electric energy storage device 30 stores therein energy generated by the engine assistant motor 40, or supplies energy to the engine assistant motor 40 to drive the engine assistant motor 40.

The engine assistant motor 40 is driven by an applied electric current, and has a function of a generator which generates surplus power of the engine 10 as well as a function of providing power to the engine 10. Since the engine assistant motor 40, which performs a function of motoring or generating power, is an already publicly known configuration, a detailed description thereof will be omitted.

The turning motor 50 is driven by an applied electric current, and has a function of turning an upper turning body, that is, the turning apparatus 71, or a function of a generator which generates surplus power of the upper turning body. Since the turning motor 50, which performs a function of motoring or generating power, is an already publicly known configuration, a detailed description thereof will be omitted.

The power converter 60 includes the DC/DC converter 63 connected to both the engine assistant inverter 61, which is connected between the electric energy storage device 30 and the engine assistant motor 40 and converts electric energy, and the turning invertor 62, which is connected between the electric energy storage device 30 and the turning motor 50 and converts electric energy, and configured to store electric energy in the electric energy storage device 30 or transmit electric energy in the electric energy storage device 30 to the engine assistant motor 40 and the turning motor 50.

A brake valve 70 is provided to selectively brake a drive of the turning apparatus 71 by the turning motor 50. In general, because of a problem of a concern about a secondary accident caused by brake impact of the turning apparatus, a brake operation is controlled to be released before starting the turning, and operated when a predetermined time has passed after completing the turning. Ultimately, the aforementioned brake operation by the brake valve 70 is used to maintain a stopped state of the turning apparatus 71 that is in a stopped state.

The hybrid control unit (HCU) is provided to electrically control the power converter 60 and the aforementioned constituent components, and supplied with operating electric power from the battery 300. In order to supply electricity for starting the engine of the vehicle or supply electricity to various electronic devices, the battery 300 is provided in the vehicle separately from the electric energy storage device 30. The hybrid control unit (HCU) is connected to an SMPS which controls electric power supplied from the battery 300 to provide electric power to the hybrid control unit (HCU). The SMPS according to the exemplary embodiment of the present disclosure is differentiated from that in the related art in that the SMPS has two electric power input ports. One electric power input port is connected to a Vkey_on path in which a switch on/off is controlled by a first switch Key1 that is operated in response to a key on manipulation of a driver, the other electric power input port is connected to a Vkey_out that is connected to the battery 300 in parallel to the Vkey_on path. On and off in Vkey_out is controlled by a second switch Key2. The second switch Key2 may allow a voltage of the battery 300 to be supplied to the SMPS by an operation of the first switch Key1, that is, the key on manipulation of the driver, and is switched by a control of the hybrid control unit (HCU). Moreover, switching on and off may also be controlled in response to a stop of the engine, a key off manipulation of the driver, or a drive of the turning motor. An example of an operation of the second switch Key2 regarding the key on and key off manipulations of the driver and the engine stop will be described as follows. First, when the first switch Key1 is switched by the key on manipulation of driver, the second switch Key2 is prepared to be switched. When the first switch Key1 is not operated as a key on signal by an operator is released, the second switch Key2 is included which switches the VKey_Out path that allows operating electric power to be supplied from the battery to the SMPS by recognizing the above situation as a stall of the engine 10, and when a stall state of the engine 10 is detected while monitoring a state of the engine by obtaining a revolution speed of the engine 10 from an ECU, which controls the engine 10, or by directly measuring a revolution speed of the engine 10, the brake 71 controls the turning motor 50 so as to be rotated at a predetermined number of revolutions or less that is close to that in a stopped state, by applying an off command signal to the brake valve 70, and thereafter, blocks operating electric power, which is supplied from the battery. That is, when it is confirmed that the turning motor 50 is being driven in a state in which a revolution speed measured by the ECU or the engine assistant motor 40 is decreased to a predetermined value or less such that a stall possibility of the engine 10 is recognized, or an operation of the first switch Key1 is stopped, the hybrid control unit (HCU) may allow a control to be performed in order to allow the second switch Key2 to be switched such that turning motion of the turning motor 50 is stopped regardless of an intention of the operator.

In other words, when the key on signal is generated by the operator, the hybrid control unit (HCU) switches the first switch Key1 so that operating electric power, that is, VBattery is supplied from the battery to the SMPS through the VKey_On path, and controls corresponding operations of the constituent components using the operating electric power. In this state, when it is confirmed that the turning motor 50 is being driven in a state in which a revolution speed measured by the ECU or the engine assistant motor 40 is decreased to a predetermined value or less such that a stall possibility of the engine 10 is recognized, or the engine 10 is stalled and the key on signal by the operator is released such that the first switch Key1 is not operated, the hybrid control unit (HCU) switches the second switch Key2 so that operating electric power is supplied from the battery to the SMPS through the VKey_Out path, and controls a zero speed of the turning motor 50 using the operating electric power so that the turning operation is stopped, thereby preventing unintended motion of the upper turning body when the engine 10 is stalled. Here, it is preferred that a drive of the first switch Key1 is stopped when the engine 10 is stalled, or the key off signal of the operator is generated.

Meanwhile, the second switch Key2 may be switched corresponding to whether a turning drive is performed. That is, while an operation of the turning motor is performed, the hybrid control unit (HCU) switches the second switch Key2 such that the SMPS may be supplied with electric power from the battery 300 even though the first switch Key1 is turned off due to various reasons. When the aforementioned turning drive is stopped, the second switch Key2 may be controlled to be turned off. This operation is performed to prevent electric power of the battery 300 from being inputted to the SMPS through the second switch Key2 such that the battery 300 is prevented from being discharged in a state in which the driver performs the key off operation and a drive of the vehicle is stopped.

Hereinafter, an operation and an effect of the turning control apparatus for a hybrid construction machine according to the exemplary embodiment of the present disclosure will be described.

Figure 3:
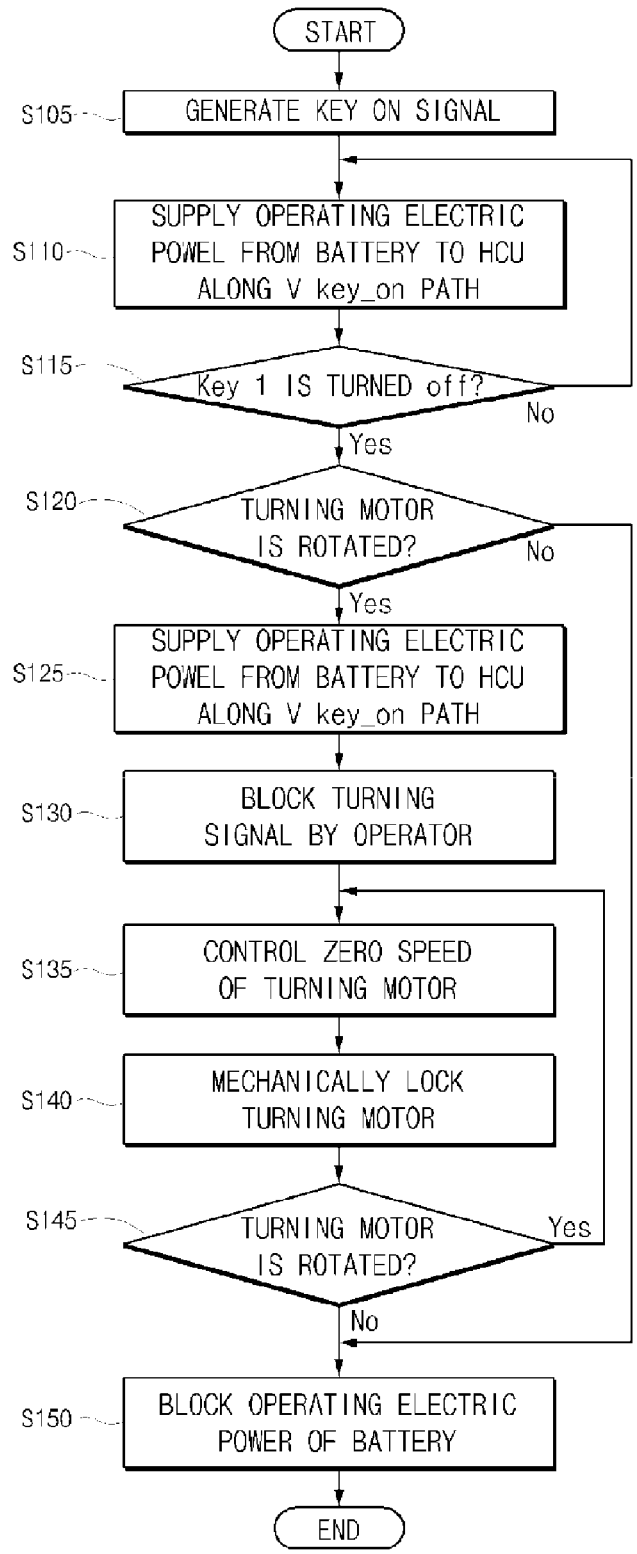
FIG. 3 is a control flow chart illustrating an operation of the hybrid control unit in the hybrid construction machine of FIG. 1.

FIG. 3 is a flow chart illustrating an operation of the hybrid control unit in the hybrid construction machine of FIG. 1.

As illustrated in FIG. 3, in the turning control apparatus for a hybrid construction machine according to the exemplary embodiment of the present disclosure, first, when the key on signal is generated by the operator (S105), the first switch Key1 of the hybrid control unit (HCU) is switched, and therefore, operating electric power is supplied from the battery 300 to the SMPS along the VKey_On path through the power converter 160, and thereby the hybrid control unit (HCU) controls corresponding work of the hybrid construction machine (S110).

Thereafter, the hybrid control unit (HCU) determines whether the engine 10 is stalled or the driver performs the key off manipulation using a revolution speed measured by the ECU or the engine assistant motor 40 (S115), and then when it is determined from the determination result that the engine 10 is stalled or the first switch Key1 is in an off state by the key off manipulation of the driver, the hybrid control unit (HCU) determines whether the upper turning body is turning, that is, whether the turning motor 50 is rotating (S120).

If the turning motor 50 is being rotated, because the key on signal by the operator is released such that the first switch Key1 is not operated, the hybrid control unit (HCU) switches the second switch Key2 so that operating electric power is supplied from the battery to the SMPS through the VKey_Out path, thereby being supplied with operating electric power (S125).

Here, when it is determined from the determination result of step S115 that the first switch Key1 is not in an off state, the hybrid control unit (HCU) returns back to step S110, and when it is determined from the determination result of step S120 that the turning motor 50 is not operated, the hybrid control unit (HCU) proceeds to step S150 that will be described below.

Thereafter, the hybrid control unit (HCU) is supplied with operating electric power through the VKey_Out path as described above, and then blocks a turning signal that is generated from an input means such as a joystick or the like that is manipulated by the operator (S130), and subsequently, controls the turning motor 50 using a control signal that allows the turning motor 50 to be rotated at a predetermined number of revolutions or less that is close to that in a stopped state (S135), and then, mechanically locks a shaft between the turning motor 50 and the upper turning body through a control of the brake valve 70 (S140). The aforementioned blocking of the turning signal is performed because the turning motor 50 is in a state capable of being operated with electric power from the electric energy storage device 30 as long as the hybrid control unit (HCU) is in a state of being supplied with electric power. When the turning signal, which is additionally produced in an emergency state in which the first switch Key1 is turned off, is not blocked, a brake control of the turning motor needs to be performed after a drive corresponding to the corresponding turning signal is completed. The reason is that the engine is in a state of being stopped or a state in which generation electric power is not inputted through the engine assistant motor 40 or the like. That is, the reason is that if the turning drive is newly performed in a state in which new electric energy is not stored in the electric energy storage device 30, electric power stored in the electric energy storage device 30 is exhausted, and therefore electric power, which allows the turning motor 50 to be braked after completing the turning drive, may be insufficient.

Thereafter, the hybrid control unit (HCU) determines once more whether the upper turning body is turning, that is, the turning motor 50 is rotating (S145), and when it is determined from the determination result that the turning motor 50 is still rotating, proceeds to step S135, and when it is determined from the determination result that a rotation of the turning motor 50 is in a state of being completed, blocks operating electric power, which is supplied from the battery (S150).

Therefore, as described above, in the hybrid construction machine according to the exemplary embodiment of the present disclosure, in addition to the VKey_On path that allows operating electric power to be supplied from the battery to the SMPS in accordance with the key on signal of the operator, the VKey_Out path, which allows operating electric power to be supplied from the battery to the SMPS when the turning motor is driven in a state in which the VKey_On path is blocked or a stall possibility of the engine is determined, is further connected to the hybrid control unit. Accordingly, even though electric power of the battery 300 is not supplied to the hybrid control unit due to a stop of the engine or the key off manipulation of the driver, operating electric power may be separately supplied to the hybrid control unit through the Vkey_out path as long as the turning motor is turning, and the hybrid control unit may perform a zero speed control of the turning motor.

Figure 4:
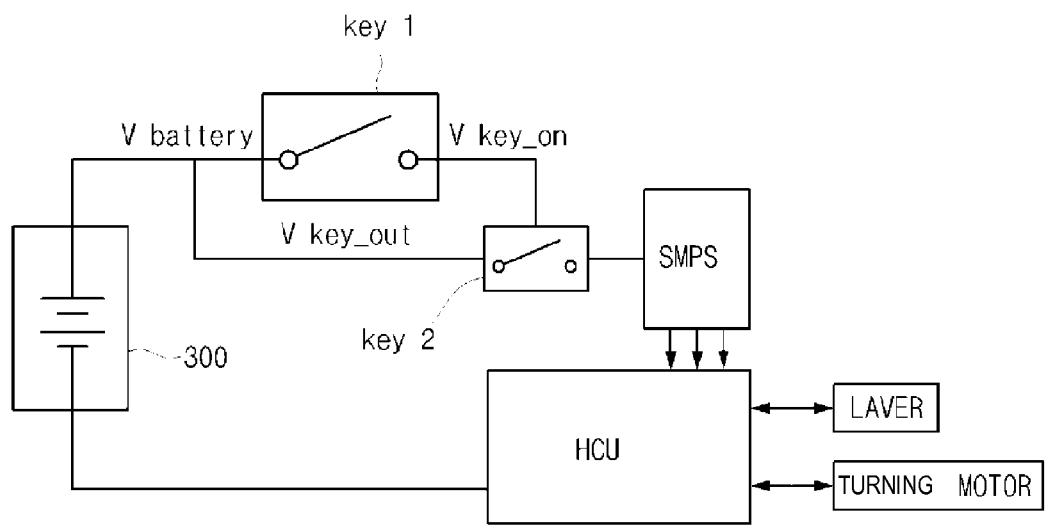
FIG. 4 is a view illustrating a drive circuit diagram of a hybrid control unit of a hybrid construction machine according to another exemplary embodiment of the present disclosure.

FIG. 4 is a view illustrating the turning control apparatus for a hybrid construction machine according to another exemplary embodiment of the present disclosure.

The turning control apparatus for a hybrid construction machine in the present exemplary embodiment has a difference from the foregoing exemplary embodiment in that the Vkey_on path is not connected to the SMPS and used as a switching power source of the second switch Key2.

An operation according to this difference in the configuration will be simply described as follows. First, when the driver performs the key on manipulation, the second switch Key2 is switched through the Vkey_on path. Accordingly, electric power of the battery 300 is applied to the SMPS via the Vkey_out path and the second switch Key2 such that an operation of the hybrid control unit (HCU) becomes possible. If the first switch Key1 is turned off due to the manipulation of the driver or an emergency situation such as a stop of the engine, the second switch Key2 is also turned off. However, the second switch Key2 in the present exemplary embodiment is configured to be controlled by the hybrid control unit (HCU) separately from a control of the first switch Key1. That is, even though the first switch Key1 is turned off during a drive of the turning motor, the second switch Key2 is controlled to maintain a switched state. Hereby, the second switch Key2 may maintain the switched state even though the first switch Key1 is turned off during a turning drive such that operating electric power may be provided to the hybrid control unit (HCU), and the hybrid control unit (HCU) controls the second switch Key2 to be turned off after the drive of the turning motor is stopped and a turning operation of the turning apparatus is completely stopped. That is, the application of operating electric power to the hybrid control unit (HCU) is prevented from being stopped during a turning drive.

According to the present exemplary embodiment, only one electric power input port may be provided in the SPMS. Moreover, the Vkey_on path may also be simplified compared to the foregoing exemplary embodiment. That is, according to the exemplary embodiment illustrated in FIG. 2, although not illustrated, separate stabilizers are installed at the Vkey_on path in order to stably provide operating electric power to the SMPS, and an electric power line, which may receive high capacity electric power, needs to be used. However, according to the present exemplary embodiment illustrated in FIG. 4, a structure of the SMPS may also be simplified, and a configuration of the Vkey_on path may also be simplified. The exemplary embodiments of the present disclosure have been described above with reference to the accompanying drawings, but it is apparent to the person skilled in the art that various substitutions, modifications, and alterations may be possible without departing from the technical spirit and essential characteristics of the present disclosure, and the present disclosure may be implemented as other specific exemplary embodiments. Accordingly, it should be understood that the aforementioned exemplary embodiments are illustrative but not restrictive in terms of all aspects.

Although the present disclosure has been described with reference to exemplary and preferred embodiments, workers skilled in the art will recognize that changes may be made in form and detail without departing from the spirit and scope of the disclosure.

The invention claimed is:
1. A turning control apparatus for a hybrid construction machine which comprises an engine, an oil hydraulic pump, an electric energy storage device, an engine assistant motor, a turning motor, a power converter, a battery mounted in a vehicle separately from the electric energy storage device, and a hybrid control unit (HCU), the turning control apparatus comprising:

an SMPS configured to apply operating electric power to the hybrid control unit (HCU) by being supplied with operating electric power from the battery;

a first switch Key1 configured to switch a VKey_On path which allows operating electric power to be supplied from the battery to the SMPS when a key on signal of a driver is inputted; and a second switch Key2 configured to switch a VKey_Out path which allows operating electric power to be supplied from the battery to the SMPS when an operation of the first switch Key1 is stopped, wherein the second switch Key2 is switched when it is confirmed that the turning motor is being driven in a state in which an operation of the first switch Key1 is stopped;

wherein when the first switch Key1 is turned off in a state in which the second switch Key2 is switched by a drive of the turning motor, the hybrid control unit (HCU) performs a brake control of the turning motor to stop the turning motor, and then turns off the second switch Key2 to block operating electric power which is supplied from the battery.

2. The turning control apparatus of claim 1, wherein when the first switch Key1 is turned off, and the second switch Key2 is maintained to be in an ON state by the turning operation, a turning manipulation inputted by the operator is disregarded.

3. The turning control apparatus of claim 1, wherein when a possibility that the engine is stalled is high while monitoring a state of the engine, the hybrid control unit turns off the first switch Key1 and turns on the second switch Key2.

4. The turning control apparatus of claim 1, wherein a drive of the first switch Key1 is stopped when the engine is stalled or a key off signal of a user is generated.

5. A turning control apparatus for a hybrid construction machine which comprises an engine, an oil hydraulic pump, an electric energy storage device, an engine assistant motor, a turning motor, a power converter, a battery mounted in a vehicle separately from the electric energy storage device, and a hybrid control unit (HCU), the turning control apparatus comprising:

an SMPS configured to apply operating electric power to the hybrid control unit (HCU) by being supplied with operating electric power from the battery;

a second switch Key2 configured to switch a Vkey_out that is a path which supplies operating electric power from the battery to the SMPS; and a first switch Key1 installed in a Vkey_on path connected to the battery and configured to switch the second switch Key2 to be in an ON state by being switched when a key on signal of a driver is inputted, wherein when a drive of the turning motor is performed, the hybrid control unit (HCU) controls an ON state of the second switch Key2 to be continued even though the first switch Key1 is turned off;

wherein when the first switch Key1 is turned off in a state in which the second switch Key2 is switched by a drive of the turning motor, the hybrid control unit (HCU) performs a brake control of the turning motor to stop the turning motor, and then turns off the second switch Key2 to block operating electric power which is supplied from the battery.

6. The turning control apparatus of claim 5, wherein when the first switch Key1 is turned off, and the second switch Key2 is maintained to be in an ON state by the turning operation, the hybrid control unit (HCU) disregards a turning manipulation inputted by the operator.

7. The turning control apparatus of claim 5, wherein when a possibility that the engine is stalled is high while monitoring a state of the engine, the hybrid control unit (HCU) turns off the first switch Key1 and turns on the second switch Key2.

8. The turning control apparatus of claim 5, wherein a drive of the first switch Key1 is stopped when the engine is stalled or a key off signal of a user is generated.

9. The turning control apparatus of claim 1, wherein when the first switch Key1 is turned off, and the second switch Key2 is maintained to be in an ON state by the turning operation, a turning manipulation inputted by the operator is disregarded.

10. The turning control apparatus of claim 1, wherein when a possibility that the engine is stalled is high while monitoring a state of the engine, the hybrid control unit turns off the first switch Key1 and turns on the second switch Key2.

11. The turning control apparatus of claim 1, wherein a drive of the first switch Key1 is stopped when the engine is stalled or a key off signal of a user is generated.

12. The turning control apparatus of claim 5, wherein when the first switch Key1 is turned off, and the second switch Key2 is maintained to be in an ON state by the turning operation, the hybrid control unit (HCU) disregards a turning manipulation inputted by the operator.

13. The turning control apparatus of claim 5, wherein when a possibility that the engine is stalled is high while monitoring a state of the engine, the hybrid control unit (HCU) turns off the first switch Key1 and turns on the second switch Key2.

14. The turning control apparatus of claim 5, wherein a drive of the first switch Key1 is stopped when the engine is stalled or a key off signal of a user is generated.

\* \* \* \* \*